Dec. 23, 1952   H. H. HALONEN   2,622,327
TORCH CUTTING MACHINE FOR LARGE PIPES AND THE LIKE
Filed July 5, 1947   4 Sheets-Sheet 2

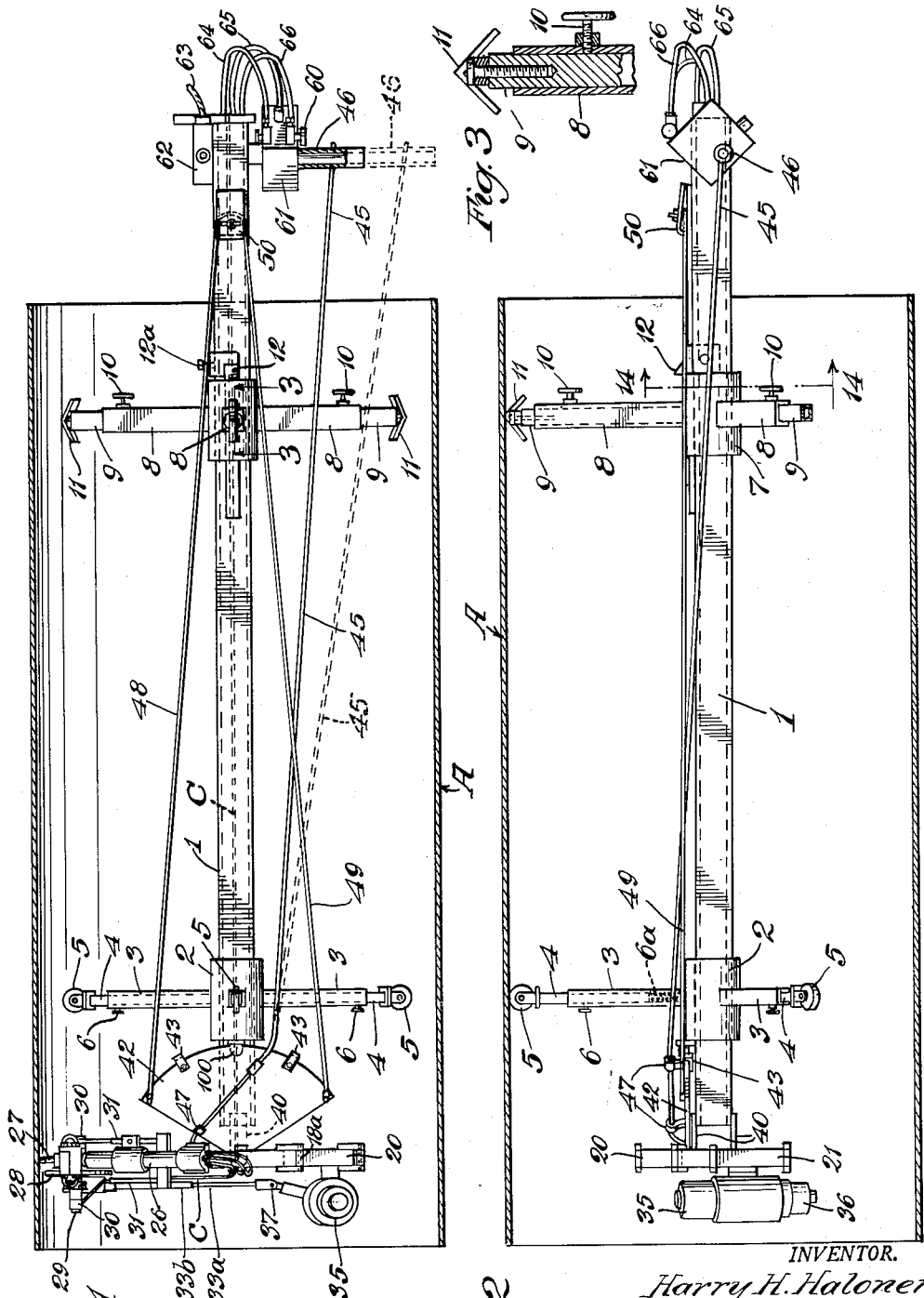

INVENTOR.
Harry H. Halonen
by Parker & Carter
Attorneys

Dec. 23, 1952 — H. H. HALONEN — 2,622,327
TORCH CUTTING MACHINE FOR LARGE PIPES AND THE LIKE
Filed July 5, 1947 — 4 Sheets-Sheet 3

INVENTOR.
Harry H. Halonen
BY Parker & Carter
Attorneys

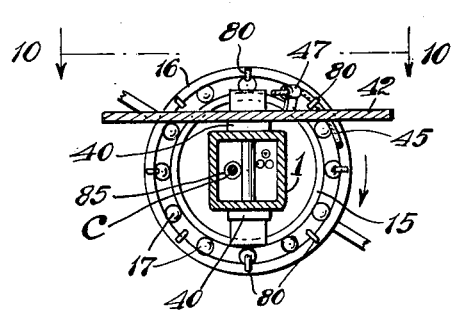
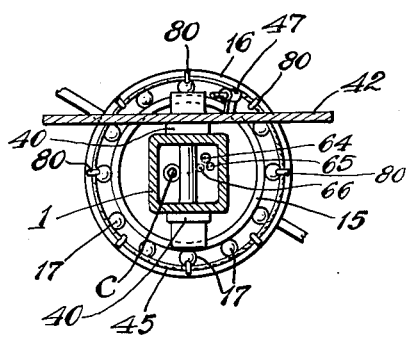
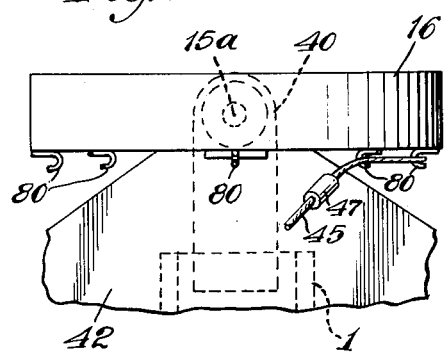
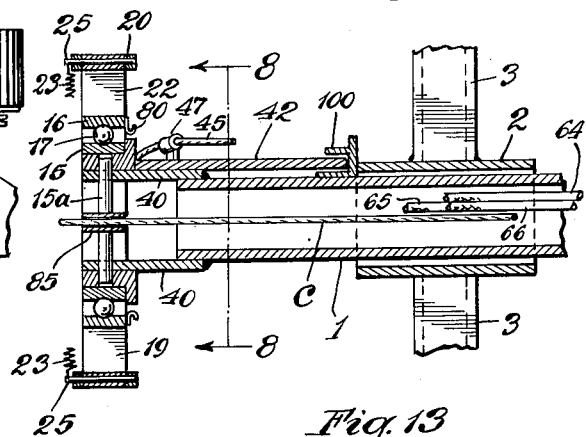
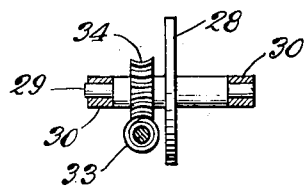
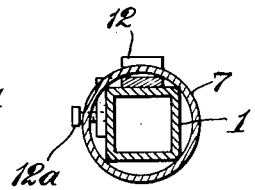
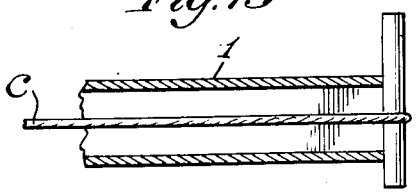

Patented Dec. 23, 1952

2,622,327

UNITED STATES PATENT OFFICE 2,622,327

TORCH CUTTING MACHINE FOR LARGE PIPE AND THE LIKE

Harry H. Halonen, Milwaukee, Wis., assignor to Nordberg Manufacturing Company, Milwaukee, Wis., a corporation of Wisconsin Application July 5, 1947, Serial No. 759,196

8 Claims. (Cl. 33—21)

My invention relates to an improvement in torch cutting machines for large pipe and the like.

One purpose is to provide an improved cutting apparatus which may be inserted into a pipe of substantial length and may operate to cut at a substantial distance from the end of the pipe at which the operator stands.

Another purpose is to provide a torch cutting machine with a rotating cutting assembly, which may be rotated throughout an arc of the order of 360 degrees, without entangling the actuating or control members.

Another purpose is to provide a cutter which may cut at various angles, or in various planes, at a variety of angles to the axis of the pipe.

Another purpose is to provide a pipe cutting structure which is usable with a substantial length or diameter of pipe.

Another purpose is to provide improved adjusting means for such a cutter.

Another purpose is to provide means for setting a normally adjustable cutter to cut a substantial run of pipe without the need of adjustment for individual cutting jobs.

Other purposes will appear from time to time in the course of the specifications and claims.

The invention is more or less diagrammatically illustrated in the accompanying drawings, wherein:

Figure 1 is a plan view;

Figure 2 is a side view;

Figure 3 is a section on an enlarged scale along the line 3—3 of Figure 1.

Figure 8 is a partial sectional view along the line 8—8 of Figure 11.

Figure 9 is a similar view illustrating the position of the parts after a complete revolution, and ready to unwind.

Figure 10 is a plan view along the line 10—10 of Figure 8.

Figure 11 is a partial longitudinal section along the axis of the device, and illustrated at 11—11 on Figure 4.

Figure 12 is a section along the line 12—12 of Figure 4.

Figure 13 is a section along the line 13—13 of Figure 5.

Figure 14 is a section along the line 14—14 of Figure 2.

Figure 15 is a detail.

Like parts are indicated by like symbols throughout the specification and drawings.

Figure 4:
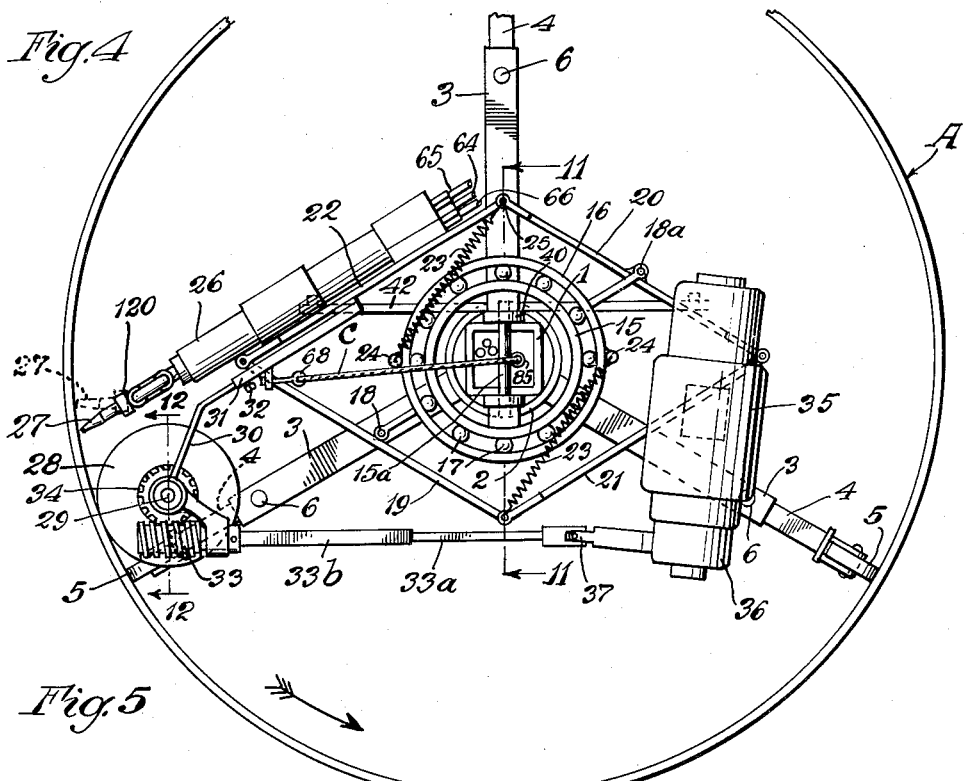
Figure 4 is an end view on an enlarged scale.

Referring to the drawings, A generally indicates a pipe, herein shown as of substantial diameter, in the interior of which a machine embodying the invention can be positioned. It will be understood that the individual machine herein shown may be employed with pipe of substantial length and diameter, it being further understood that the mechanism herein shown may be made of various sizes, for operation with pipe of different ranges of diameter.

With reference, for example, to Figures 1 and 2, I illustrate a structure which includes a central tubular support 1, indicated as rectangular in cross-section. Mounted at one end of the tube 1 is a round collar or support 2, having parts 2a to prevent rotation, and provided with generally radially extending hollow tubular legs 3, in which are telescopically positioned extension members 4, carrying rollers 5 at their outer ends. The rollers 5 may be adjusted suitably to contact with the inner face of the pipe A and the parts may then be manually set by use of suitable setscrews 6. On one leg, preferably the top one, a spring thrust is employed, as by the spring 6a.

Adjustable along the tube 1 is any suitable movable collar 7 carrying radially extending hollow tubular members 8, in which extension members 9 are telescopically mounted. These can be manually set by setscrews 10, with contact member 11 engaging the inner surface of the pipe A. It will be understood that the sleeve 7 is not fixed in relation to the tube 1. Thus the tube 1 may be given a range of movement, along the axis of the pipe, which may be limited at one end of its excursion by a positioning member or limit 12, which may be adjustably secured to the tube.

The calibrated gauge 12 slips between the collar 7 and the tube and is provided with a setscrew 12a by which it can be locked to the tube 1. The purpose is to provide means for measuring how far back the cutter head is being withdrawn.

Positioned at one end of the tube 1 is a rotatable cutting structure. I illustrate, for example, an inner ball bearing or roller bearing element 15, mounted on the tube 1, but rotatable about the axis 15a, and an outer element 16, rotatable on the balls or rollers 17. The outer element or ring 16 has pivoted to it, as at 18, 18a, links or members 19, 20. These, in turn, are pivoted at their ends to the opposite ends of intermediate links or members 21, 22, to form an expansible frame.

Figure 6:
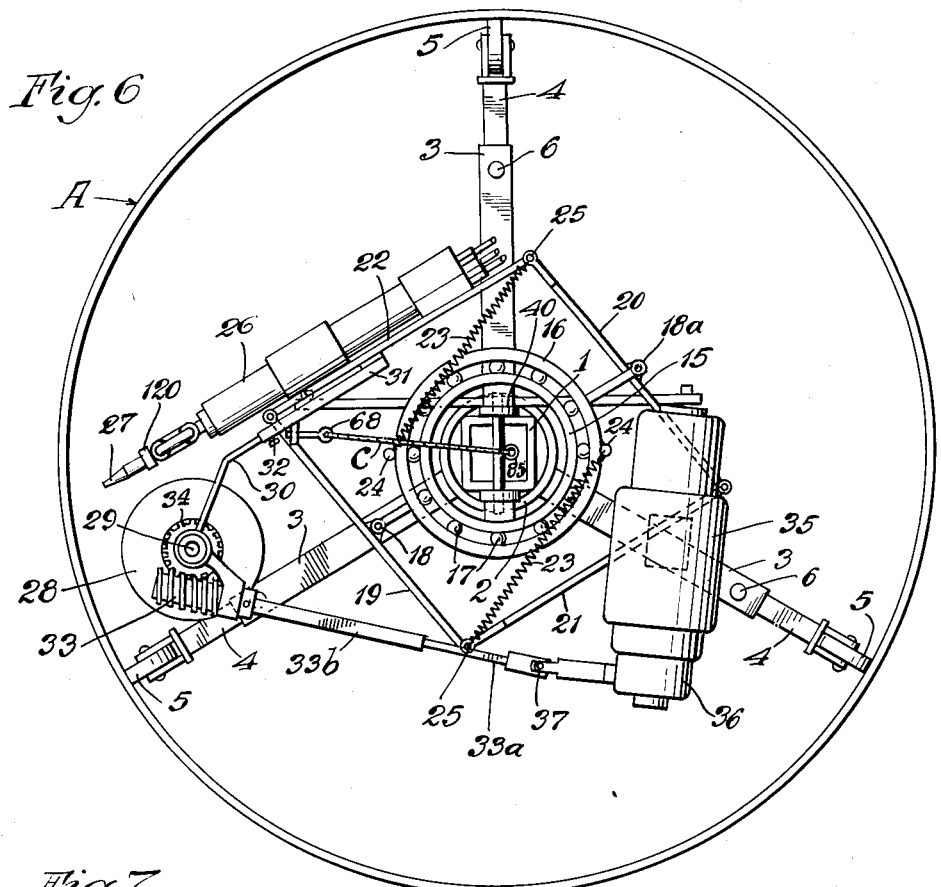
Figure 6 is a view similar to Figure 4 illustrating the parts in a different position.

Any suitable springs 23 are normally secured at their inner ends 24 in relation to the members 16, and at their outer ends 25 in relation to the pivotal connection between adjacent links 19, 21 and 22, 20 as shown in Figure 6.

The member 22 is shown as carrying any suitable metal cutting torch assembly 26, the details of which do not of themselves form part of the present invention and are not herein described. Any suitable cutting nozzle or tip 27 may be employed.

An actuating roller 28 is pivoted as at 29 upon a support 30, adjustable in the socket 31 in relation to link 22. It may be set or adjusted by any suitable bolt or setscrew 32, and limits the position of the cutting nozzle in relation to the inner face of the pipe A.

It will be understood that, in the use of the device, the driving or traction roller 28, which may be knurled if desired, is set in contact with the inner surface of the pipe A. In use it is driven by any suitable motor 35, through any suitable gear reduction 36, and through the universal joint connection 37, which drives a worm 33 in mesh with the worm gear 34, which drives the wheel 28. Thus, when the motor 35 is energized and when the tip 27 is delivering a cutting flame, the actuating wheel 28 may be used to rotate the above-described working head through a complete revolution, thus making a cut of 360 degrees.

Since the cutting assembly rotates through substantially a complete circle or more, it is important that the parts be so arranged that there is no entanglement or breakage of the actuating members employed. It is also desirable that the cutting assembly be adjustable, so that it can cut in a plane perpendicular to the axis of the pipe, or in planes at an adjustable angle to the axis of the pipe.

Figure 7:
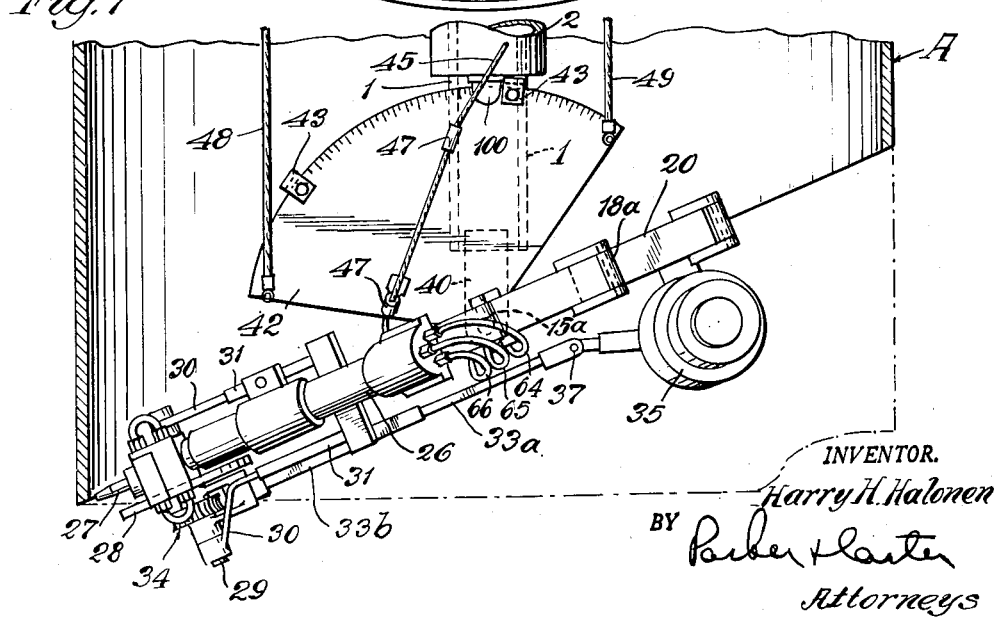
Figure 7 is a partial plan view illustrating the parts in a different position.

With reference, for example, to Figure 7, it will be noted that the cutting assembly is adjustably mounted on an extension 40 at one end of the square tube 1, the center of adjustment for rotation being indicated at 15a. 42 is an actuating and locking segment rotatable in unison with the cutting assembly. This segment may be manually set, when desired, to any angular position, its motion being limited by any suitable limit members 43, which engage the edge of the segment 42.

I illustrate, for example, a pair of control cables 48 and 49, which are secured at their outer ends at opposite sides of the segment 42. At their opposite ends they are accessible to the operator and can be locked in adjusted position by any suitable means, such as the clamp 50.

Figure 5:
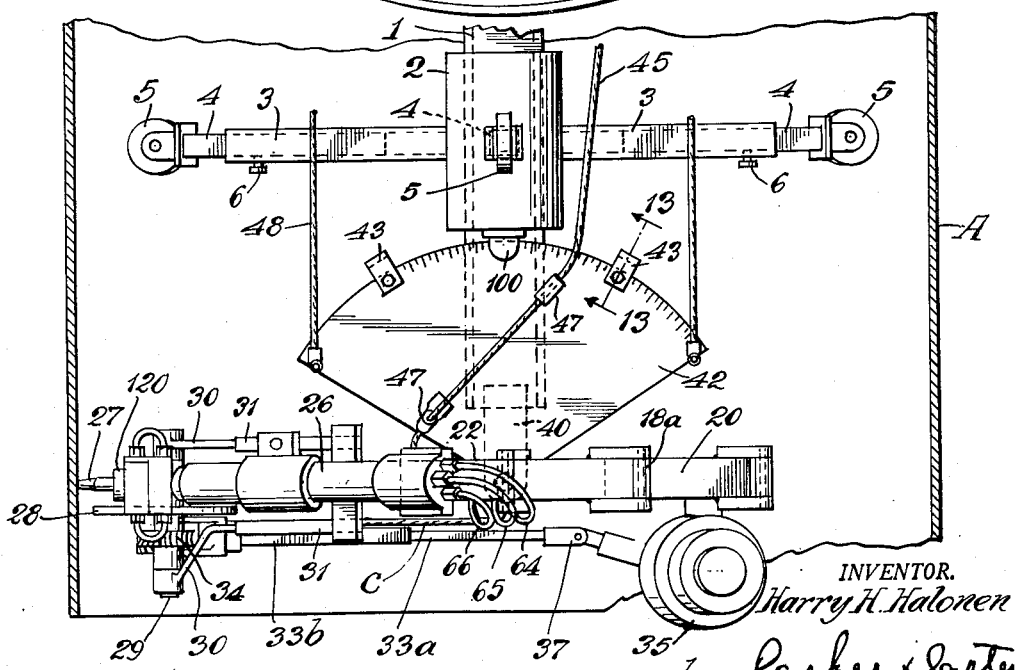
Figure 5 is a partial plan view on an enlarged scale.

With reference to Figure 7, it will be understood that the cable 49 has been drawn in the proper direction to move one limit member 43 against the fixed centering lug 100. This sets the cutting plane of the cutting assembly, as shown in Figure 7. If the operator wishes to move the assembly to cut in a different plane, or cut an opposite angle, he can do so by releasing the cables 48 and 49 and by pulling in on the cable 48 until the opposite limit member 43 engages the opposite side of the centering or limiting lug 100. If he wishes to center the parts with the axis of the cutting head coaxial with the tube, he may lock the parts in the position in which they are shown in Figure 5 by locking both cables in the clamp 50, with the segment in the position of Figure 5. Thus the cables 48 and 49 are effective to control the angle of cut of the cutting assembly or head.

The additional cable 45 is used to return the cutting head to initial position after it has made a complete cutting revolution. The cable 45 is secured to a control handle 46 and passes through guides 47 on the segment 42. It continues through the guide 47 and passes about hooks 80 on the members 16, as shown for example in Figure 10. It is permanently fastened at its end, at one point, on the member 16. Assume that the parts are set for a cutting rotation, the result of the rotation is to wind the cable 45, in the hooks 80, around the member 16. After the cut has been finished by a complete rotation, then the operator can pull out on the handle 46, thus rotating the member 16 in the opposite direction, until it is ready for another cutting rotation.

During the normal cutting operation, the springs 23 are effective to hold the roller 28 against the inner surface of the pipe A, with the cutting apparatus or tip 27 in proper cutting position. At the end of the cutting excursion or complete rotation, I may employ the collapsing or withdrawing cable C to disengage the roller 28 from the inner surface of the pipe A. The cable C may be guided near its inner end as at 85, and its inner end is secured to an eye 68 on the cutting frame. Thus when the user pulls in on the cable C the result is to collapse the cutting frame against the pressure of the springs 23, which withdraws the roller 28 from contact with the inner surface of the pipe A, and permits the operator to use the cable 45 to make a reverse rotation until the parts are in initial cutting position.

Before the operator releases cable C, however, he moves the cutting assembly back into the next cutting position. This can be done by releasing one setscrew of the securing collar, at the opposite end of the tube 1, and moving it in the pipe to move or withdraw the entire cutting head. The opposite support, having the rollers 5, one of which is spring thrust, simply rolls on the inner face of the pipe A.

When the parts are set at the new position the cable C can then be released and the springs 23 are effective to expand the cutting frame with the roller 28 in contact with the inner surface of the pipe A and with the cutting tip or tube or nozzle 27 ready for the next cut.

It will be understood that once the assembly has been inserted in the pipe, the support nearest the operator, including the legs 8, and their telescopic interior components 9, remains locked in the tube for all cuts on that particular tube. The assembly can be drawn up until the collar 2 actually engages or, preferably, approaches the collar 7. It should not be drawn too close, as that would make necessary an unduly fine setting of the telescopic members, if a precision cut is necessary.

Note that the tip of the cutter may be pivoted as at 120 for adjustment in relation to the radius of the tube.

It will be noted, from Figure 4, that the driving connection between the joint 37 and the worm 33 is telescopic, including the square telescopic members 33a and 33b.

Any suitable valve connection may be shown for controlling the cutting torch. I illustrate, for example, any suitable valve members 60 on the control element 61. 62 indicates a control box adapted for connection with any suitable outside source of electric current. Any suitable conductive connection may be employed for controlling the operation of the motor. These conductive connections may extend through the interior of the square tube 1, as shown at 63. It will also be understood that the flexible ducts or connections 64, 65 and 66 for the torch may pass through the interior of the square tube, as shown, for example, in Figures 8 and 9.

Since the various flexible connections extending between the exterior and the cutter assembly pass through the interior of the normally fixed square tube 1 and are connected to structures on the rotating frame, it is important that the arc of movement of the frame or cutting assembly be limited to one complete revolution.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

I claim:

1. In a pipe cutting device, a base member, means for positioning it within the pipe to be cut, generally along the axis of the pipe, including longitudinally spaced supports formed and adapted to extend between said member and the inner surface of the pipe, one of said supports being movable with said member, the said member being mounted for axial movement in relation to the other support, a cutter assembly rotatably mounted at one end of said member, power actuated means on said assembly including a traction wheel for imparting rotation to it through a cutting arc of the order of 360 degrees, and manually actuated flexible winding means for returning it to initial position after its movement through such an arc.

2. The structure of claim 1, characterized by and including means for adjusting the cutting plane of the cutter assembly in relation to the axis of the pipe.

3. The structure of claim 1, characterized by and including anti-frictional rollers mounted on the ends of the support which is movable with the member, and adapted to engage the inner surface of the pipe.

4. The structure of claim 1 characterized by and including a cutter assembly rotatably mounted on one end of said base member, said cutter assembly including a ring, a pantograph frame on said ring, a cutter on said frame, means for normally urging said pantograph frame to expanded cutter position, and manually controllable flexible means extending to and operable from the opposite end of said base member for collapsing said pantograph frame to withdraw the cutter from cutting position.

5. In a pipe cutting device, an elongated base, means for positioning it within the pipe to be cut, generally along the axis of the pipe, including a plurality of sets of supports spaced longitudinally along said base and adapted to extend between the latter and the inner surface of the pipe, a cutter assembly rotatably mounted at one end of the base including a cutter adjustable relative to the inner surface of the pipe, a control assembly for the cutter assembly, located at the opposite end of the base at a point accessible to an operator outside of the pipe, and a flexible, manually actuated control member for said cutter assembly extending from said control assembly to the cutter assembly, and adapted, when actuated by the operator, to return the cutter assembly to initial position after it has made a cutting revolution.

6. The structure of claim 5, wherein means are provided for adjusting the cutting plane of the cutter assembly in relation to the axis of the pipe.

7. In a pipe cutting device, an extensible base structure including a plurality of relatively movable members, means for positioning said base structure within an open-ended pipe to be cut, including longitudinally spaced sets of supports formed and adapted to extend between said base structure and the inner surface of said pipe, one of said sets of supports being movable with one of said extensible members, and the other set of supports being carried by the other of said members, a cutter assembly rotatably mounted adjacent one end of said member, power actuated means for imparting rotation to said cutter assembly through a cutting arc of the order of 360 degrees, and manually actuated means for returning it to initial position after its movement through a cutting arc.

8. The structure of claim 7 including means for adjusting the cutting plane of the cutter assembly in relation to the axis of the pipe, whereby said cutter assembly is adapted to selectively cut said pipe at a plurality of angles with relation to the axis of the pipe.

HARRY H. HALONEN.

REFERENCES CITED

The following references are of record in the file of this patent:

UNITED STATES PATENTS

| Number | Name | Date |
|---|---|---|
| 1,024,983 | Frink | Apr. 30, 1912 |
| 1,124,784 | Monro | Jan. 12, 1915 |
| 1,345,242 | Reymonds | June 29, 1920 |
| 1,358,818 | Bering | Nov. 16, 1920 |
| 1,539,383 | Bienenstok | May 26, 1925 |
| 1,692,924 | Brown | Nov. 27, 1928 |
| 1,915,912 | Anderson | June 27, 1933 |
| 2,054,925 | Bucknam et al. | Sept. 22, 1936 |
| 2,380,569 | Anderson | July 31, 1945 |